United States Patent
Gapontsev et al.

(10) Patent No.: US 9,031,099 B2
(45) Date of Patent: May 12, 2015

(54) FIBER WITH ASYMMETRICAL CORE AND METHOD FOR MANUFACTURING SAME

(71) Applicants: Valentin I Gapontsev, Worcester, MA (US); Mikhail Vyatkin, Fryazino (RU); Vladimir Sergueev, Burbach (DE); Dan Myasnikov, Moscow (RU); Ilya Zaytsev, Burbach (DE)

(72) Inventors: Valentin I Gapontsev, Worcester, MA (US); Mikhail Vyatkin, Fryazino (RU); Vladimir Sergueev, Burbach (DE); Dan Myasnikov, Moscow (RU); Ilya Zaytsev, Burbach (DE)

(73) Assignee: IPG Photonics Corporation, Oxford, MA (US)

( * ) Notice: Subject to any disclaimer, the term of this patent is extended or adjusted under 35 U.S.C. 154(b) by 85 days.

(21) Appl. No.: 13/866,250

(22) Filed: Apr. 19, 2013

(65) Prior Publication Data

US 2014/0314105 A1   Oct. 23, 2014

(51) Int. Cl.
  *H01S 3/30* (2006.01)
  *G02B 6/02* (2006.01)
  *B29D 11/00* (2006.01)
  *H01S 3/067* (2006.01)

(52) U.S. Cl.
  CPC .......... *G02B 6/02* (2013.01); *B29D 11/00721* (2013.01); *H01S 3/06729* (2013.01)

(58) Field of Classification Search
  CPC . H01S 3/06708; H01S 3/06729; H01S 3/067; G02B 6/02; B29D 11/00721; B29D 11/00

USPC ............. 372/6; 385/11, 97, 98, 123–128, 146
See application file for complete search history.

(56) References Cited

U.S. PATENT DOCUMENTS

| | | | | |
|---|---|---|---|---|
| 4,274,854 | A * | 6/1981 | Pleibel et al. | 65/403 |
| 4,742,318 | A * | 5/1988 | Jen et al. | 333/141 |
| 6,580,860 | B1 * | 6/2003 | Varner | 385/123 |
| 6,954,575 | B2 * | 10/2005 | Fermann et al. | 385/128 |
| 2002/0162361 | A1 * | 11/2002 | Okagawa et al. | 65/403 |
| 2005/0084223 | A1 * | 4/2005 | Tanaka et al. | 385/125 |
| 2006/0083471 | A1 * | 4/2006 | Berkey et al. | 385/125 |
| 2007/0177846 | A1 * | 8/2007 | Chen et al. | 385/125 |
| 2008/0141725 | A1 | 6/2008 | Shimoda et al. | |
| 2009/0154503 | A1 * | 6/2009 | Peyghambarian et al. | 372/6 |
| 2011/0064095 | A1 * | 3/2011 | Gapontsev et al. | 372/6 |
| 2013/0195411 | A1 * | 8/2013 | Nagashima et al. | 385/126 |
| 2014/0218788 | A1 * | 8/2014 | Gapontsev et al. | 359/326 |

OTHER PUBLICATIONS

WO2013025218 (Gapontsev et al.).*
International Search Report, dated May 2, 2013.

* cited by examiner

*Primary Examiner* — Colleen A Matthews
*Assistant Examiner* — Delma R Forde
(74) *Attorney, Agent, or Firm* — Yuri Kateshov, Esq.; Timothy J. King, Esq.

(57) ABSTRACT

An optical active fiber is configured with an asymmetrically-shaped core having at least one long axis and a shortest axis which extends transversely to the long axis. The outmost cladding of the active fiber is configured with a marking indicating the orientation of the short axis. The marking allows for bending the fiber so that the shortest axis extends along and lies in the plane of the bend thereby minimizing distortion of a mode which is guided by the asymmetrically-shaped core as light propagates along the bend.

5 Claims, 3 Drawing Sheets

FIBER WITH ASYMMETRICAL CORE AND METHOD FOR MANUFACTURING SAME

BACKGROUND OF THE DISCLOSURE

1. Field of the Disclosure

The disclosure relates to an optical fiber configured with a noncircular core which is structured to minimize the reduction of the effective area of the fundamental mode along curved stretches of the fiber.

2. Prior Art Discussion

The advent of high power fiber laser systems would not be possible without large mode area (LMA) active fibers. As the power scaling of fiber laser systems grows, strict requirements are applied to the quality of lased radiation. As known to an ordinary skilled worker in the art ("posita"), the fewer the modes guided along the core, the higher the light quality. Hence great efforts are made to configure MM fibers capable of supporting substantially a single, nearly diffraction-limited fundamental mode at the desired wavelength. Once the latter is properly exited, the MM core guides this mode further down a light path without substantial distortion. The latter is largely correct in the context of substantially straight fibers. In practice, however, fibers typically have bends or curved stretches.

Typically for standard fibers, such as fibers with a step-index profile of the core, when a fundamental mode propagates along a curved stretch, its effective area, i.e., a quantitative measure of the area which a mode effectively covers in the transverse dimension, decreases. The displacement of the fundamental mode towards the periphery of the core causes an overlapped area, i.e., the area common to a core region with gain medium and fundamental mode, to shrink. At the same time, the displacement of high order modes towards the core periphery along the bend is not as great as in the case of the fundamental mode. A relatively insignificant displacement of high order modes (HOMs) towards the core periphery along the bend may cause the amplification of the HOM to be substantially greater than the amplification of these modes along the straight stretch of the core. The greater the amplification of HOMs, the lower the quality of the output beam.

As the core area increases, the above disclosed effects become more and more pronounced. These phenomena appear to be one of the main factors limiting the enlargement of the core area and, therefore, the power scaling of active fibers with a step index profile and core diameters at least equal to about 30 μm.

FIGS. 1A and 1B confirm the above. FIG. 1A illustrates the fundamental mode displacement in a 32 μm core extending along a 9 cm radius; FIG. 1B shows the displacement of the mode in a 110 μm core along a 15 cm radius. Clearly, the greater the core diameter, the greater the mode distortion.

The methods of fiber manufacturing and fiber configurations minimizing the bend-induced mode distortion are known. One of the known structures is configured with a parabolic refractive index profile providing for less reduction of the mode area along a fiber bend than that one of the step-index. Also known fiber configurations operating not with a fundamental mode, but with one of higher order modes which each have Δneff—the difference between refractive indices of respective core and mode—higher than that one for the fundamental mode. The higher modes thus are not as susceptible to fiber bends as the fundamental mode is.

SUMMARY OF THE DISCLOSURE

The disclosure teaches an alternative configuration of MM core minimizing the mode distortion along curved stretches of MM active and/or passive fibers, a high power fiber laser system incorporating the fiber and a method of utilizing the disclosed fiber configuration in the laser system.

The disclosed fiber is based on the relationship between a parameter S, indicating the degree of the mode distortion, and a radius of core. The relationship can be approximated as follows:[1]

[1] J. M. Fini "Design of LMA amplifier fibers resistant to bend-induced distortion", Vol. 24, No. 8/Augusy/2007, Journal of Optical Society of America $$\Delta n\text{bend} = n\text{core} * R\text{core} / R\text{bend},$$

where Δnbend is the difference between refractive indices of respective opposite peripheral segments of the core as a result of the bend, Rcore is the core radius and Rbend is the bend radius of fiber;

$$\Delta n\text{eff} = n\text{core} - n\text{eff},$$

where Δneff is the difference between refractive indices of respective mode and core;

Based on the foregoing, when Δneff≤Δnbend, the fundamental mode is displaced which is associated with the appearance of the outer core region (i.e., the region opposite to the direction of the shift or the one relative to the center of the bend).

The parameter of distortion S=Δnbend/Δneff

Since $\Delta n\text{eff} \sim C^*(1/R\text{core})^2$, S is proportional to $R^3_{core}$. Thus, the smaller the radius, the smaller the distortion.

According to the disclosure, an active or passive fiber is provided with the core which has a noncircular configuration characterized by differently dimensioned axes. To minimize the mode distortion along a bend, the fiber is positioned so that its smallest axis lies in the plane of the bend. The outer cladding of the disclosed fiber is appropriately marked so that the orientation of the short axis is clear for proper spooling and further installation.

BRIEF DESCRIPTION OF THE DRAWINGS

The disclosure is further described in detail illustrated by the following drawings.

SPECIFIC DESCRIPTION

Figure 1A:
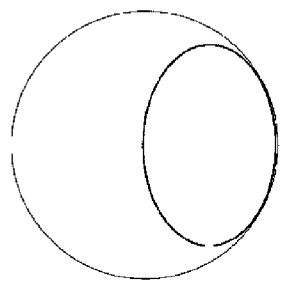
FIGS. 1A and 1B illustrate the behavior of the mode in a circularly-shaped core of fiber extending along bends with respective smaller and larger radii.
Figure 1B:
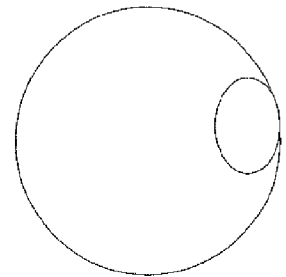

Reference will now be made in detail to the disclosed system. Wherever possible, same or similar reference numerals are used in the drawings and the description to refer to the same or like parts or steps. The directional terms including, but not limited to such words as up, down and the like are to be interpreted exclusively with respect to the plane of the sheet. The drawings are in simplified form and far from precise scale.

Figure 2A:
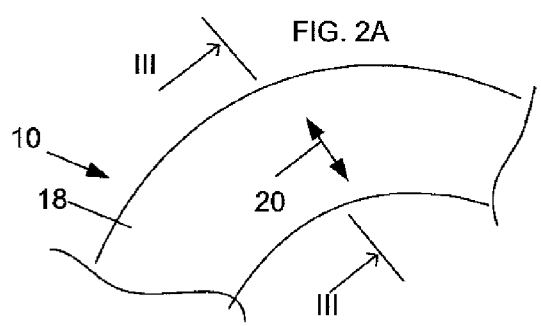
FIGS. 2A and 2B illustrate elevation side and cross-sectional views, respectively, of an exemplary elliptically shaped asymmetrical core configured in accordance with the disclosure.
Figure 2B:
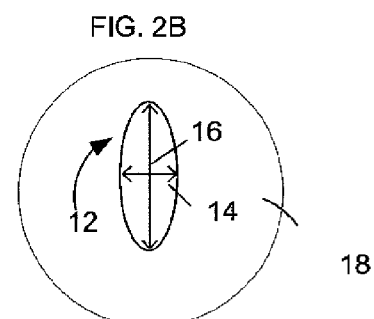

FIGS. 2A and 2B illustrate one of many possible configurations disclosed LMA fiber 10. The fiber 10 includes one or more claddings 18 (only one is shown), and a MM core 12 surrounded by the claddings and doped with one or a combination of rare-earth elements. The multimode core 12 is configured to support a single, preferably fundamental transverse or very few modes at the desired wavelength. As shown from the illustrated example of the disclosed fiber, core 12 has an elliptical shaped cross-section. The fiber 10 may or may not be polarization maintaining fiber; the fiber also may be active or passive.

The multimode elliptical core 12 is configured with a short axis 14 and a long axis 16 (FIG. 2B). In accordance with the disclosure, active fiber 10 with asymmetrically-shaped core 12 is positioned along a bend so that short axis 14 extends along the plane and in the plane of the bend.

Figure 3:
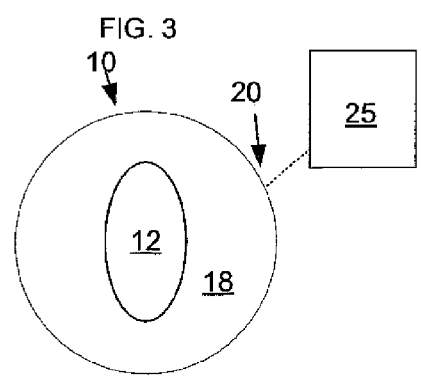
FIG. 3 illustrates a technique of marking the cladding of the disclosed fiber with insignia indicating the direction of the short axis of the asymmetrical core of FIG. 2B.

FIG. 3 illustrates one of techniques providing the user with a simple and effective structure for proper positioning of fiber 10 along a bend. In particular, during the drawing step of the disclosed manufacturing process, outer cladding 18 is provided with a marking 20, also seen in FIG. 2A, indicating the orientation of the short axis 14. This can be easily realized by applying paint to the cladding along the desired direction from a paint reservoir 25.

Figure 4:
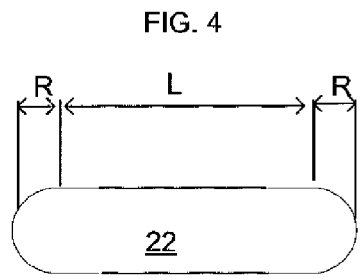
FIG. 4 illustrate a modification of the asymmetrical core of the disclosed fiber.

FIG. 4 illustrates a slightly modified core 22 provided with opposite curved stretches each with a radius R, and two rectilinear stretches each having a length L and bridging the curved stretches. The fundamental mode in core 22, like in core 12 of FIG. 3, is elongated along the long axis.

Figure 5:
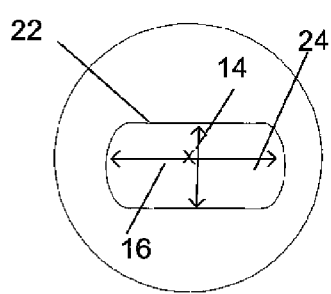
FIG. 5 illustrates distortion of the mode supported by the core of FIG. 6 when the short axis of the core lies in the plane of a bend.
Figure 6:
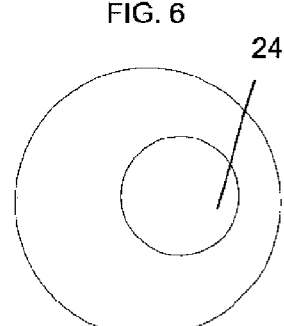
FIG. 6 illustrates distortion of the mode supported by the core of FIG. 6 when the short axis of the asymmetrical core lies in the plane perpendicular to that one of the bend.

FIGS. 5 and 6 illustrate the mode shape change in core 22 of FIG. 4. Since core 22 is asymmetrical, the mode behavior depends on the plane in which the bend extends. In FIG. 5, the center of the bend lies on short axis 14, i.e. the fiber is curved along a short axis which lies in the plane of the bend. The mode 24 substantially preserves its shape and is only slightly displaced relative to the center of core 22. In contrast, when the bend extends in the plane of long axis 16, as shown in FIG. 6, the distortion of the mode is clearly manifested by the reduced mode area and the shift of the mode towards the circumference from the center of core 22.

Figure 7:
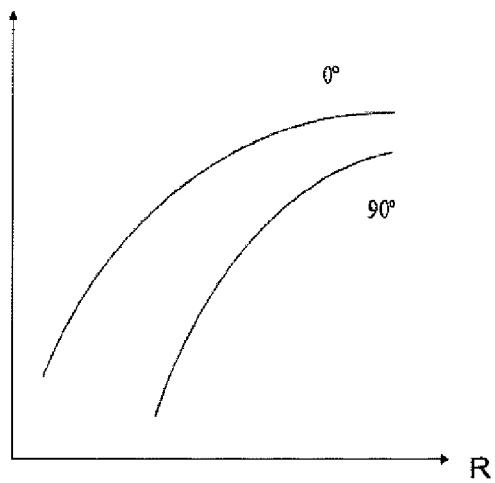
FIG. 7 is a graph illustrating the dependence of the degree of the mode area distortion from the bend radius for two bend planes of respective FIGS. 5 and 6.

FIG. 7 illustrates the dependence of the mode area from the bend radius for two different bend planes: 0 degrees and 90 degrees. The 0 degree graph clearly shows greater mode distortion.

Figure 8:
FIGS. 8 and 9 illustrate further exemplary respective shapes of the asymmetrical core of the disclosed fiber.
Figure 9:
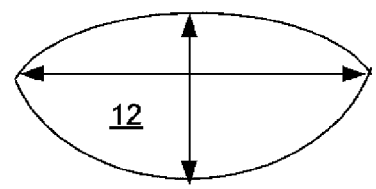

Referring to FIGS. 8 and 9, the core shape and therefore mode intensity profile is not limited to the elliptical shape and can be manufactured with any regular shape or irregular shape. The regular shape may be, for example, a polygonal shape which without limitation includes triangular, rectangular, star-like and etc. FIG. 8 illustrates an example of polygonal shape represented by a rectangular. FIG. 9 illustrates an example of irregular shape including two rectilinear sides bridged by inwardly curved sides. The criticality of the core's geometry in accordance with the disclosure is the presence of multiple axis with one of the them being the smallest. In general, the core shape is a function of the number of cuts through a preform, the depth and direction at which the cuts extend and process temperature.

Figure 10A:
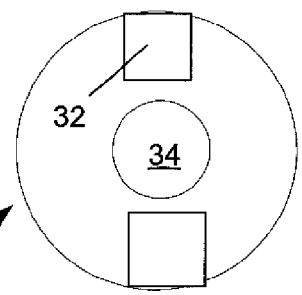
FIGS. 10A and 10B illustrate an exemplary technique used in the disclosed process of manufacturing of the disclosed asymmetrical core.
Figure 10B:

FIGS. 10A and 10B schematically illustrate the method of manufacturing fiber 10 having elliptical core 12. A preform 30 (FIG. 10A) is provided with diametrically opposite cuts 32. As the fiber being drawn, a round core 34 accepts an elliptical shape of core shown in FIG. 10B.

Figure 11:
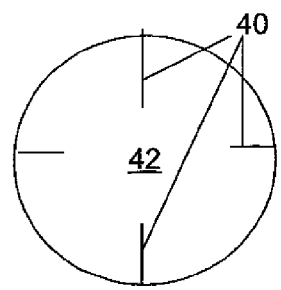
FIG. 11 illustrates one of the stages of the disclosed process.

FIG. 11 illustrates a technique for configuring a rectangular core. To receive the latter, two pairs of cuts each including a pair of diametrically opposite and differently-dimensioned indents 40, is made in a preform 42. In general, the cuts may or may not be uniform and may be positioned diametrically asymmetrically, have different depth and direction all depending on the desired core shape.

Figure 12:
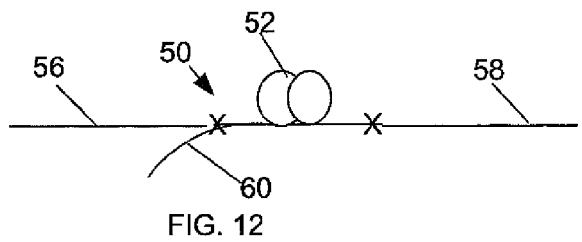
FIG. 12 is a fiber laser system incorporating the disclosed fiber.

FIG. 12 illustrates a fiber laser system 50 provided with a large mode area fiber 52 which is configured with a multimode (MM) core doped with one or more rare earth elements and having, for example, an elliptically-shaped cross-section. The laser system 50 further may include input and output passive fibers 56 and 58, respectively which support propagation of a fundamental mode. The passive fibers each may have a single mode or multimode structure; if the passive fiber is configured as a multimode fiber, substantially only a fundamental mode is excited at the input of such a fiber. Completing system 50 is a passive MM delivery fiber 60 launching pump light into active fiber 52 in accordance with a side pump scheme.

Figure 13:
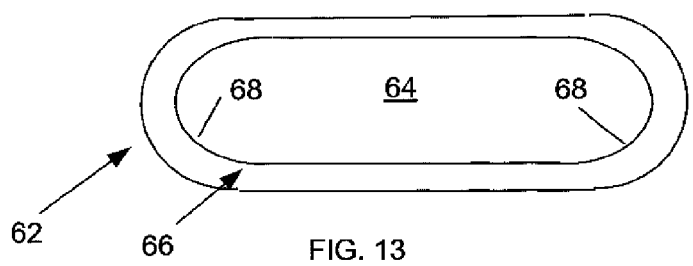
FIG. 13 is a view of the bottom half of the housing enclosing the system shown in FIG. 12.

FIG. 13 diagrammatically illustrates a bottom 64 of a fiber block's housing 62. While fiber block 62 may a variety of shapes, the illustrated one has an elliptical shape. The bottom 64 is provided with a guide 66 configured to receive and guide active fiber 52 of FIG. 12 along a path having two bends 68. The active fiber thus has two curved stretches corresponding to the opposite bends 68 of guide 66. In accordance with the disclosure, the active fiber is provided with an asymmetrically shaped core and extends along the bends so that the shortest axis of the core extends along the curved segment of each bends 68.

With the proliferation of high power fiber lasers, strict requirements are often applied to the quality and power of output light. To prevent unacceptable power loss of signal light launched from input fiber 56 into MM core 54 and excitement of high order modes in the latter, it is necessary that a mode field diameter of fundamental mode of active fiber 52 substantially match that one of input fiber 56. These can be attained by two following configurations.

Figure 14:
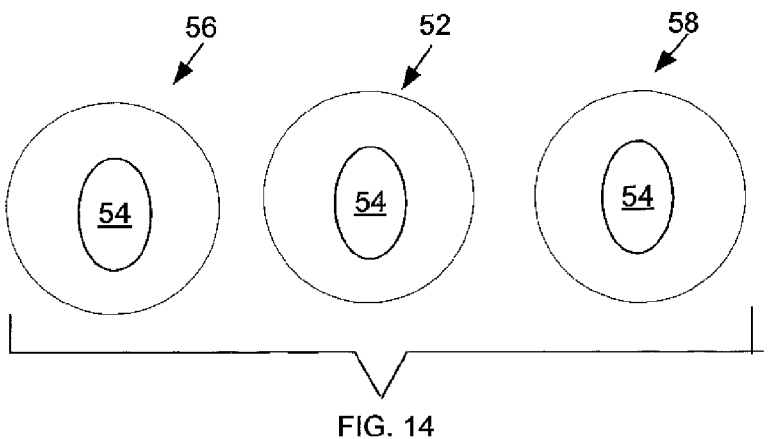
FIG. 14 illustrates configurations of respective passive and active fibers of the system of FIG. 12.
Figure 15:
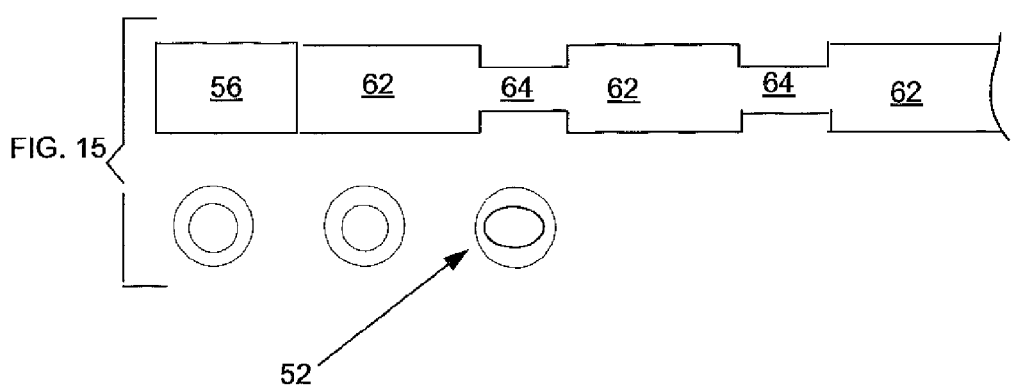
FIG. 15 illustrates a further modification of the disclosed fiber.

Referring to FIG. 14 and considering the latter in light of FIG. 12, passive input and output fibers 56, 58, respectively, each are configured with substantially uniform elliptical preferably, but not necessarily, SM core 54. Accordingly, when passive and active fibers are butt-spliced, the respective cores are aligned which allows for the excitement of substantially only a fundamental mode in active fiber 52. FIG. 16, discussed in conjunction with FIG. 12, illustrates the other configuration providing for minimal light losses. In particular, active fiber 52 is drawn with alternating regions 62, 64, respectively, having different core profiles. The region 62 has a typical circular core, whereas region 64 is configured with an asymmetrically-shaped core and insignia on the outer periphery which indicates the correct orientation of the core's short axis. The circular cores of respective input and output regions 62 each are shaped and dimensioned so that a MFD of SM signal light supported by input passive fiber 56 (FIG. 12) substantially matches that one of the fundamental mode of active fiber 60. Similarly, a SM passive output fiber 58 is configured so that the circularly-profiled fundamental mode propagating through a butt-splice region between these fibers does not loose any substantial power. The active fiber 52 is further so configured that it has a transitional region between regions 62 and 64 along which the circular profile transform into the elliptical one and back to the circular one.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

The invention claimed is:

1. A fiber laser system comprising at least one fiber gain block provided with:
    input and output passive fibers having respective spaced ends facing one another;
    a coreless pump light delivery fiber guiding a pump light; and
    an optical active fiber extending in a side-by-side configuration with and receiving the pump light from the delivery fiber, the active fiber having:
        opposite ends which are butt-spliced to respective spaced ends of the input and output passive fibers, respectively,
        at least one stretch of an asymmetrically-shaped multimode (MM) core with at least one long axis and a shortest axis extending transversely to the long axis, the asymmetrically-shaped core being configured to support substantially a fundamental transverse mode or very few transverse modes at a desired wavelength, and
    an outmost cladding surrounding the core and having a marking which indicates the orientation of the short axis, wherein the input and output passive fibers each are configured with an asymmetrically-shaped core structured substantially identically to the asymmetrically-shaped core of the active fiber so that signal light propagating at the desired wavelength through the butt-spliced ends has minimal losses.

2. The fiber laser system of claim 1, wherein the active fiber is configured with multiple additional stretches flanking the one stretch and each having a portion of the core with circularly shaped.

3. The fiber laser system of claim 1, wherein the input and output passive fibers each are a multimode or single mode (SM) fiber.

4. The fiber laser system of claim 1, wherein the gain block has a housing provided with a guide which has at least one bend lying in a plane and receiving the one stretch of the active fiber so that the shortest axis of the asymmetrical core extends in the plane of the bend.

5. A fiber laser system comprising at least one fiber gain block provided with:
    input and output passive fibers having respective spaced ends facing one another;
    a coreless pump light delivery fiber guiding a pump light; and
    an optical active fiber extending in a side-by-side configuration with and receiving the ump light from the active fiber having:
        opposite ends which are butt-spliced to respective spaced ends of the input and output passive fibers, respectively,
        at least one stretch of an asymmetrically-shaped core with at least one long axis and a shortest axis extending transversely to the long axis,
    an outmost cladding surrounding the core and having a marking which indicates the orientation of the short axis, wherein the active fiber is a large mode area fiber selected from polarization maintaining or not polarization maintaining fibers.

* * * * *